W. H. Boozer,
Loom.

No. 112,679.  Patented Mar. 14, 1871.

Witnesses.
C. A. Wilson
Edmund Masson

William H. Boozer.
By Atty. A. B. Stoughton.

United States Patent Office.

WILLIAM H. BOOZER, OF POTTER'S MILLS, PENNSYLVANIA.

Letters Patent No. 112,679, dated March 14, 1871.

IMPROVEMENT IN LOOMS.

The Schedule referred to in these Letters Patent and making part of the same.

*To all whom it may concern:*

Be it known that I, WILLIAM H. BOOZER, of Potter's Mills, in the county of Centre and State of Pennsylvania, have invented certain new and useful Improvement in Harness-Motion for Looms; and I do hereby declare the following to be a full, clear, and exact description of the same, reference being had to the accompanying drawing making a part of this specification, in which—

Figure 1:
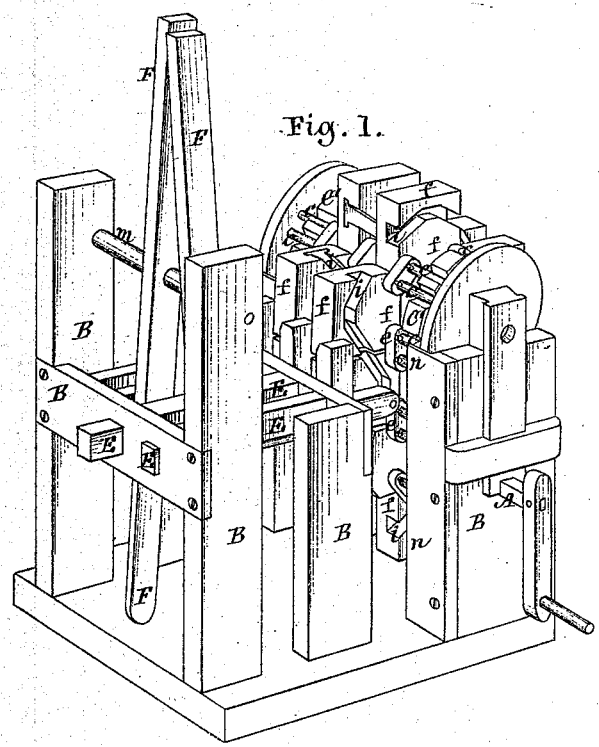
Figure 1 represents, in perspective, so much of a loom as will illustrate my invention.

My invention consists in a pattern-chain or a series of pattern-chains for looms for weaving figured fabrics, composed of a series of links united into a chain, which is moved over or around guiding-surfaces, and the links of which pattern-chain are furnished with grooves in their sides for operating horizontal levers that in turn operate vertical levers for operating the harness, and which links are susceptible of different arrangement to change the figure of the fabric, as may be desired, within the capacity of the loom.

To enable others skilled in the art to make and use my invention, I will proceed to describe the same with reference to the drawing.

On a shaft, A, suitably hung in the loom-frame B, and moved by any well-known means and power, is arranged any suitable number of chain-carrying and supporting-wheels or disks c, having depressions a a in their perimeter for receiving, holding, and freely releasing the shafts or journals c c c, &c., on which the links e and blocks f of the pattern-chain turn when moving around with said wheels or disks. And that the pattern-chain, as a whole, may move in an elongated circuit, and not in a circle, guide-pieces D are affixed to the frame, against the outer edge g g g of which the projecting ends of the shafts or journals c take, and are so guided in such elongated path aided by an upper series of carrying disks c'.

The blocks or sections f that compose the pattern-chain are united by the links e, the shafts c being the pivotal center of each.

In the sides of these blocks or sections are formed angular or curved grooves i i, in which a stud or pin, with or without a friction-roll, on the ends of each of the horizontal levers E E, &c., work, and by which said levers receive a reciprocating motion in the line of their length, which is governed entirely by the "throw" given to the slots and the arrangement of the blocks in the pattern-chain, so that the slots will alternate or run in pairs, or otherwise.

On a shaft, m, is arranged a series of vertical levers, F, one for each horizontal lever, pattern, or harness, and these levers F pass through mortises in the horizontal levers E, or may be otherwise connected to them, so that the movement of the levers E by the pattern-chain shall cause the levers F to vibrate on their shaft m. To the upper ends of the levers F the harness is fastened, by cords passing over pulleys or in any other well-known way, for working the harness and warps in them.

The grooves i in the blocks or sections f may be ordinary plain ones, or dovetailed, or undercut, so as to receive a headed stud or pin; but a simple groove, with ordinary guiding or controlling devices, will serve every purpose.

Any number of these pattern-chains may be used on a loom, the number corresponding with the harness to be used or the varied figures of the goods to be woven in the loom, and the grooves in the sections f, or the sections themselves, being selected and arranged for such figures.

While the edges g of the guide-pieces D hold the projecting ends of the chain-shafts or journals c in one direction, flanges or strips n n on the frame guide them in the opposite direction, so that the chain must travel in its true path or circuit.

Figure 2:
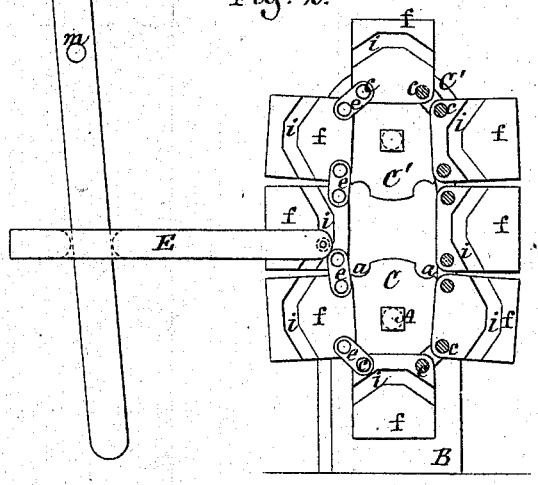
Figure 2 represents a side view of the pattern-chain and its co-operative parts.
Figure 3:
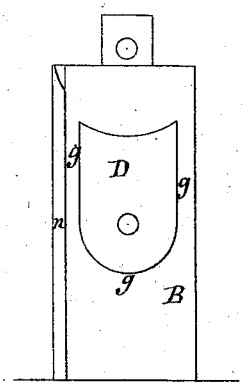
Figure 3 represents a side view of one of the pattern-chain guide-pieces.

On the left of fig. 2 the grooves in the blocks alternate, so as to cause a uniform traverse of the levers E.

On the right of said figure the sections f' f' are shown as in pairs, so that the traverse of the levers would be only half as much as in the alternate arrangement. They can be arranged in any other combinations desired.

Having thus fully described my invention,

What I claim therein as new and desire to secure by Letters Patent, is—

The pattern-chain for looms, composed of blocks or sections linked together and grooved in the sides, and operating to move the harness through levers intervened for that purpose, substantially as described and represented.

WM. H. BOOZER.

Witnesses:
   A. B. STOUGHTON,
   JOHN BOOZER.